March 9, 1954     H. NUTT     2,671,534
BRAKE
Filed Aug. 11, 1949

Inventor:
Harold Nutt

Patented Mar. 9, 1954

2,671,534

UNITED STATES PATENT OFFICE 2,671,534

BRAKE

Harold Nutt, Chicago, Ill., assignor to Borg-Warner Corporation, Chicago, Ill., a corporation of Illinois Application August 11, 1949, Serial No. 109,735

4 Claims. (Cl. 188—77)

My invention relates to brakes and, more particularly, to an improved construction for fixing a brake band applying strut against endwise movement in a slot formed for the strut in an end of the band.

It is an object of my invention to provide an improved construction comprising a brake band having a slot in an end thereof receiving a strut, with one of the members being provided with a notch extending at angles with respect to the slot and the other member having a raised tab fitting in the notch for holding the strut against endwise movement out of the slot. More particularly, it is an object of the invention to provide the notch in the end of the brake band and to provide the raised tab in the strut.

Figure 1:
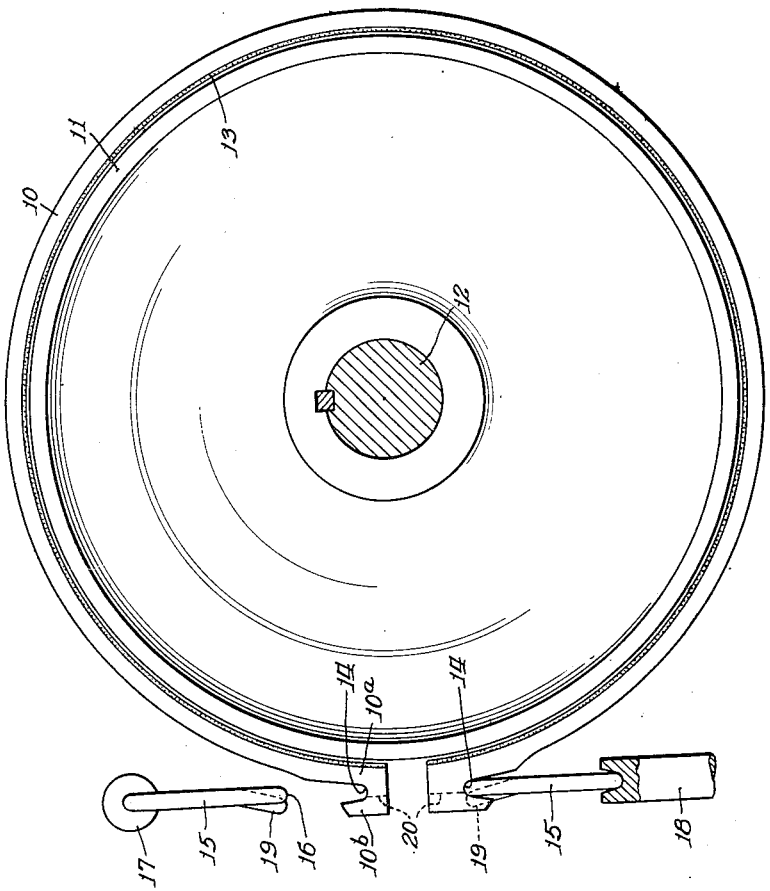
Figure 2:
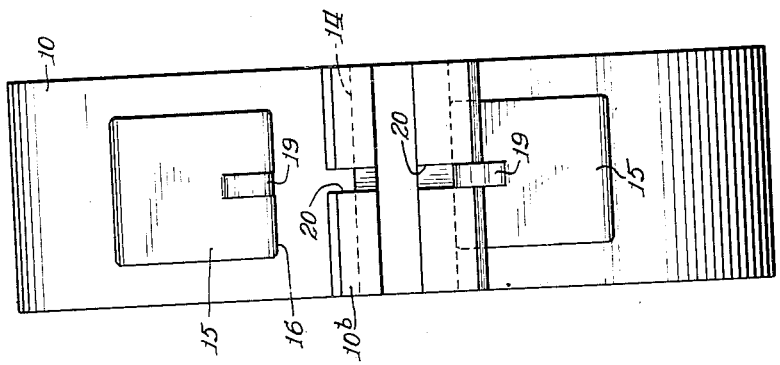

The invention consists of the novel constructions, arrangements and devices to be hereinafter described and claimed for carrying out the above-stated objects and such other objects as will appear from the following description of a preferred embodiment of the invention illustrated with reference to the accompanying drawings, wherein:

Fig. 1 is a side view of a brake drum and a brake band surrounding the drum, with band-applying struts being illustrated in connection with the two ends of the band and with one strut being shown out of its normal engagement with the end of the band for illustrative purposes; and Fig. 2 is a side view of the construction shown in Fig. 1.

Like characters of reference designate like parts in the several views.

Referring now to the drawing, a brake band 10 is illustrated surrounding a brake drum 11 fixed on a shaft 12. The band 10 may be a metal forging and has fixed to its inner surface a strip of friction lining 13. The band and drum are both substantially cylindrical, and the band is adapted to be contracted to engage the drum for braking and holding the drum stationary for any suitable purpose.

The band 10 is provided with an axially extending slot 14 at each end formed between the main portion 10a of the band and a backwardly extending tip portion 10b. A strut 15 is provided for each of the slots 14, and the strut has a rounded end 16 adapted to fit in the slot 14 and have a limited rotative movement therein. The band 10 is tightened about the drum 11 by applying pressure to the struts 15 so as to bring the ends of the band together. Although I have illustrated one of the struts 15 as being out of its slot 14, the strut in operation of the band 10 is in contact with the bottom of the corresponding slot 14 as will be understood. Any suitable pressure-applying mechanism may be utilized for acting on the struts in order to engage the band, such as the stationary part 17 and the movable part 18. The band's own resiliency may be utilized for disengaging the band from the drum.

The struts 15 are each held from movement endwise out of the slots 14 by means of a projection tab 19 sheared out and bent up in the middle of the strut. A notch 20 is provided in each of the tip portions 10b, and the tab 19 of the strut 15 fitting in the corresponding slot 14 is disposed in the notch 20. The tabs 19 of the struts 15 fitting in the notches 20 thus coact with the notches to prevent endwise movement of the struts out of the slots 14.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a brake, the combination of a brake band having two ends and adapted to have force applied to the ends for changing the diameter of the band to apply it to a drum, one of said ends having a slot formed therein, a strut fitting in said slot for applying force to that end of the band, and means for preventing endwise movement of the strut out of the slot in the end of said band and including a notch formed in one and a projection integral with the other of said strut and band with the projection fitting in the notch, said strut and band including contacting surfaces on each side of the interfitting projection and notch for applying force through the contacting surfaces from the strut to the band.

2. In a brake, the combination of a substantially cylindrical brake band having one end with a slot formed therein extending axially of the band, and a strut having a transverse linear end fitting in and extending for a major portion of the length of said slot for applying force to that end of the band, said band at that end being provided with a notch extending transversely of the slot, said strut being formed with a tab sheared out of the strut and extending into said notch for holding the strut against endwise movement out of the slot.

3. In a brake, the combination of a brake band having two ends, each of said ends having a slot formed therein, a strut fixed to a stationary part and fitting into the slot in one of said ends for providing a reaction for the brake, a second strut fixed to a force applying member and fitting in the slot in the other of said ends for applying a force to the band for contracting the band and applying it to a drum, each of said ends of the band having a notch provided therein intermediate the ends of the slots, and tabs sheared out and bent up in each of the struts intermediate the sides thereof and projecting into the respective notches for preventing endwise movement of the struts out of the slots.

4. In a brake, the combination of a brake band having two ends, each of said ends having a slot formed therein extending axially of the band, a strut fixed to a stationary part and having a transverse linear end fitting in and extending for a major portion of the length of the slot in one of said ends for providing a reaction for the brake, a second strut fixed to a force applying member and having a transverse linear end fitting in and extending for a major portion of the length of the slot in the other of said ends for applying a force to the band for contracting the band and applying it to a drum, each of said ends of the band having a notch provided therein intermediate the ends of the slots and tabs formed integrally on each of said struts intermediate the sides thereof and extending into the respective notches for holding the struts respectively against endwise movement out of the slots.

HAROLD NUTT.

References Cited in the file of this patent

UNITED STATES PATENTS

| Number | Name | Date |
| --- | --- | --- |
| 573,689 | McLeod | Dec. 22, 1896 |
| 1,455,372 | Wick | May 15, 1923 |
| 1,714,833 | Wilson | May 28, 1929 |
| 2,006,064 | Young | June 25, 1935 |
| 2,182,386 | Patterson | Dec. 5, 1939 |